US010628711B2

(12) United States Patent
Balan et al.

(10) Patent No.: US 10,628,711 B2
(45) Date of Patent: Apr. 21, 2020

(54) DETERMINING POSE OF HANDHELD OBJECT IN ENVIRONMENT

(71) Applicant: Microsoft Technology Licensing, LLC, Redmond, WA (US)

(72) Inventors: Alexandru Octavian Balan, Sammamish, WA (US); Ruven Jaime Rivera, III, Bellevue, WA (US); Michael Edward Samples, Redmond, WA (US); Ivan Razumenic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 84 days.

(21) Appl. No.: 15/960,988

(22) Filed: Apr. 24, 2018

(65) Prior Publication Data
US 2019/0325274 A1 Oct. 24, 2019

(51) Int. Cl.
*G06K 9/62* (2006.01)
*G06F 3/01* (2006.01)
*G06T 7/70* (2017.01)
*G06F 3/0346* (2013.01)

(52) U.S. Cl.
CPC ........... *G06K 9/6288* (2013.01); *G06F 3/012* (2013.01); *G06T 7/70* (2017.01); *G06F 3/0346* (2013.01)

(58) Field of Classification Search
None
See application file for complete search history.

(56) References Cited

U.S. PATENT DOCUMENTS

| 9,141,194 | B1* | 9/2015 | Keyes | G06F 3/017 |
| 2006/0287085 | A1* | 12/2006 | Mao | A63F 13/06 463/37 |
| 2017/0205903 | A1* | 7/2017 | Miller | G06F 3/0346 |
| 2018/0108179 | A1* | 4/2018 | Tomlin | G02B 27/0172 |

* cited by examiner

*Primary Examiner* — David D Davis
(74) *Attorney, Agent, or Firm* — Alleman Hall Creasman & Tuttle LLP

(57) ABSTRACT

One disclosed example provides a method for determining a pose of a handheld object in a surrounding environment. Optical pose data is stored in an image queue of a first filter. IMU data is received from an IMU of the handheld object and stored in an IMU queue of the first filter. Using at least a portion of the optical pose data and the IMU data, an initial pose of the handheld object is determined and outputted. The method determines that either the image queue or the IMU queue is empty. A second filter comprising the one empty queue and the other non-empty queue is instantiated as a copy of the first filter. Using the data from the non-empty queue in the second filter, the initial pose of the handheld object is updated to an updated pose, and the updated pose is outputted.

20 Claims, 16 Drawing Sheets

DETERMINING POSE OF HANDHELD OBJECT IN ENVIRONMENT

BACKGROUND

Motion may be tracked as computing device input via data from various sensors, such as image sensors and inertial sensors.

SUMMARY

Examples are disclosed that relate to determining poses of a handheld object. One disclosed example provides a method at a computing device for determining a pose of a handheld object in a surrounding environment. Image data of the surrounding environment is received from an image sensing system, and optical pose data derived from the image data is stored in an image queue of a first filter. Inertial measurement unit (IMU) data from an IMU of the handheld object is received and stored in the first filter. Using at least a portion of the optical pose data and at least a portion of the IMU data from the first filter, an initial pose of the handheld object is determined and outputted.

The method then determines that one of the image queue and the IMU queue is empty and the other queue is non-empty. Based on determining that one of the image queue and the IMU queue is empty and the other queue is non-empty, a second filter is instantiated as a copy of the first filter comprising the one empty queue and the other non-empty queue. Using the data from the non-empty queue in the second filter, the initial pose of the handheld object is updated to an updated pose which is outputted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

This application discloses examples related to computing systems comprising head-mounted display devices (HMDs) that interface with handheld controllers and/or other peripheral objects, e.g. as parts of a gaming system. To make a gaming experience more immersive, the poses of a HMD and a handheld controller may be tracked as the devices are moved through space by a user to provide inputs to control a user interface of the HMD. Such pose tracking also may be used for computing device interactions other than gaming.

The disclosed examples may utilize cameras, such as a stereo camera arrangement on the HMD, for visually tracking a handheld object, such as a game controller. In other examples, the disclosed methods may use external image sensing systems, such as cameras mounted in the surrounding environment, to visually track one or more handheld controllers used with the HMD. Additionally, a handheld controller may include one or more sensors, such as an inertial measurement unit (IMU) that may include an accelerometer, gyroscope, magnetometer, and/or other suitable sensors. These sensor(s) provide output related to changes in the pose (position and orientation) of the handheld controller.

To derive poses of the handheld object and the HMD with respect to real world coordinates, a sensor fusion system may integrate time-synced data from diverse sources at high frequencies. In some examples, optical pose data and/or IMU data from an HMD and IMU data from a handheld object may be fused by a sensor fusion system. For example, one or more Kalman filters may combine the IMU readings with loosely-coupled visual pose measurements to derive a pose. In other examples, data may be fused in any suitable manner.

Such sensor fusion systems may utilize a process model which can predict a future state given the current state. In some examples, such systems may 'predict' to the next timestamp, then use the observed data to 'condition' the state estimate. However, when data measurements are out-of-order, delayed, or missing, these approaches may generate incorrectly fused data and introduce errors that negatively impact user experiences. Accordingly and as described in more detail below, the present disclosure presents techniques that compensate for out-of-order, delayed, and missing data in determining poses to support low latency, low jitter virtual reality experiences. In some examples, the disclosed systems and methods may select and fuse data in manners that optimize among latency, accuracy and jitter to provide desired user experiences.

Figure 1:
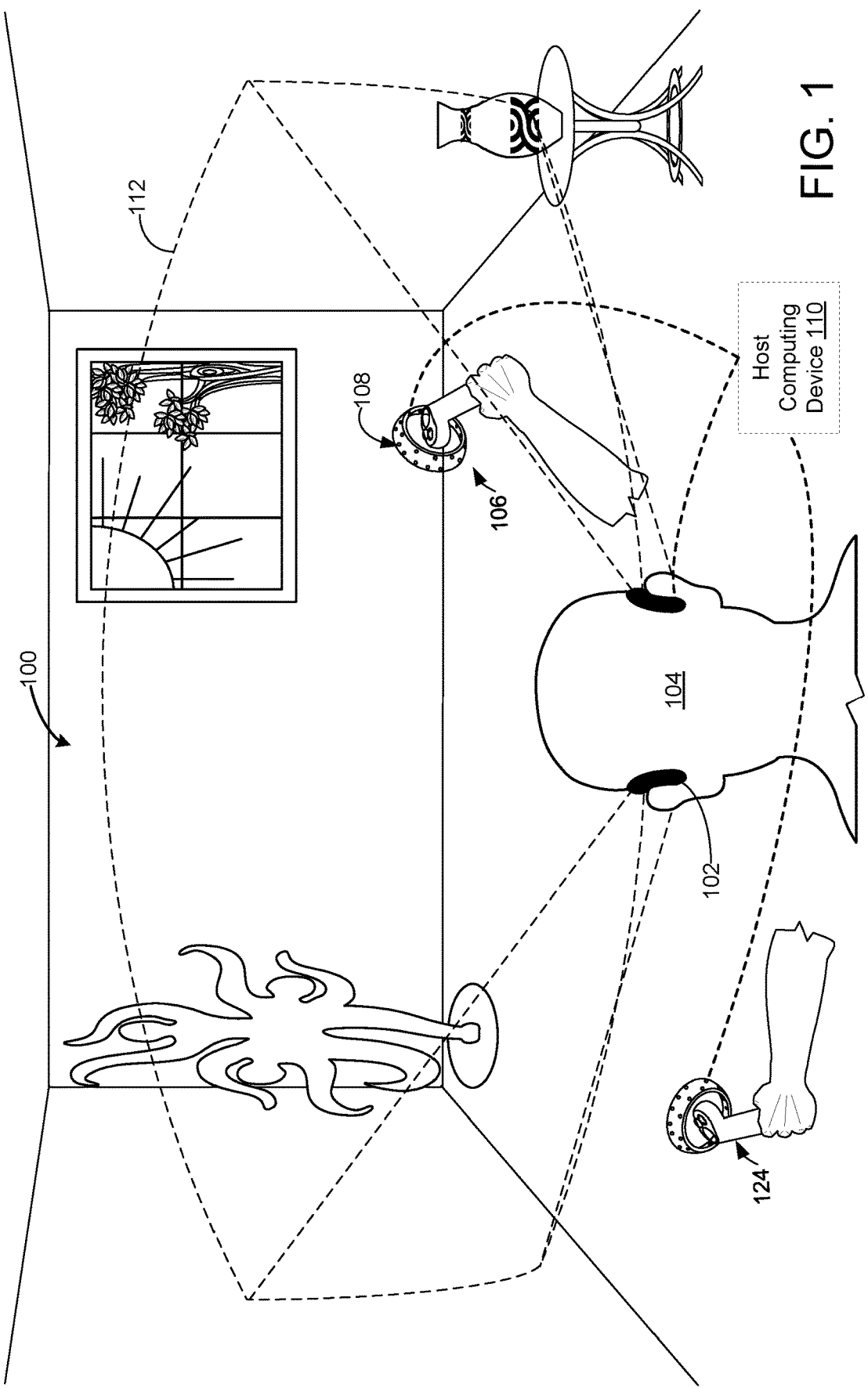
FIG. 1 shows an example use scenario in which poses of a handheld object may be tracked as computing device input.
Figure 2:
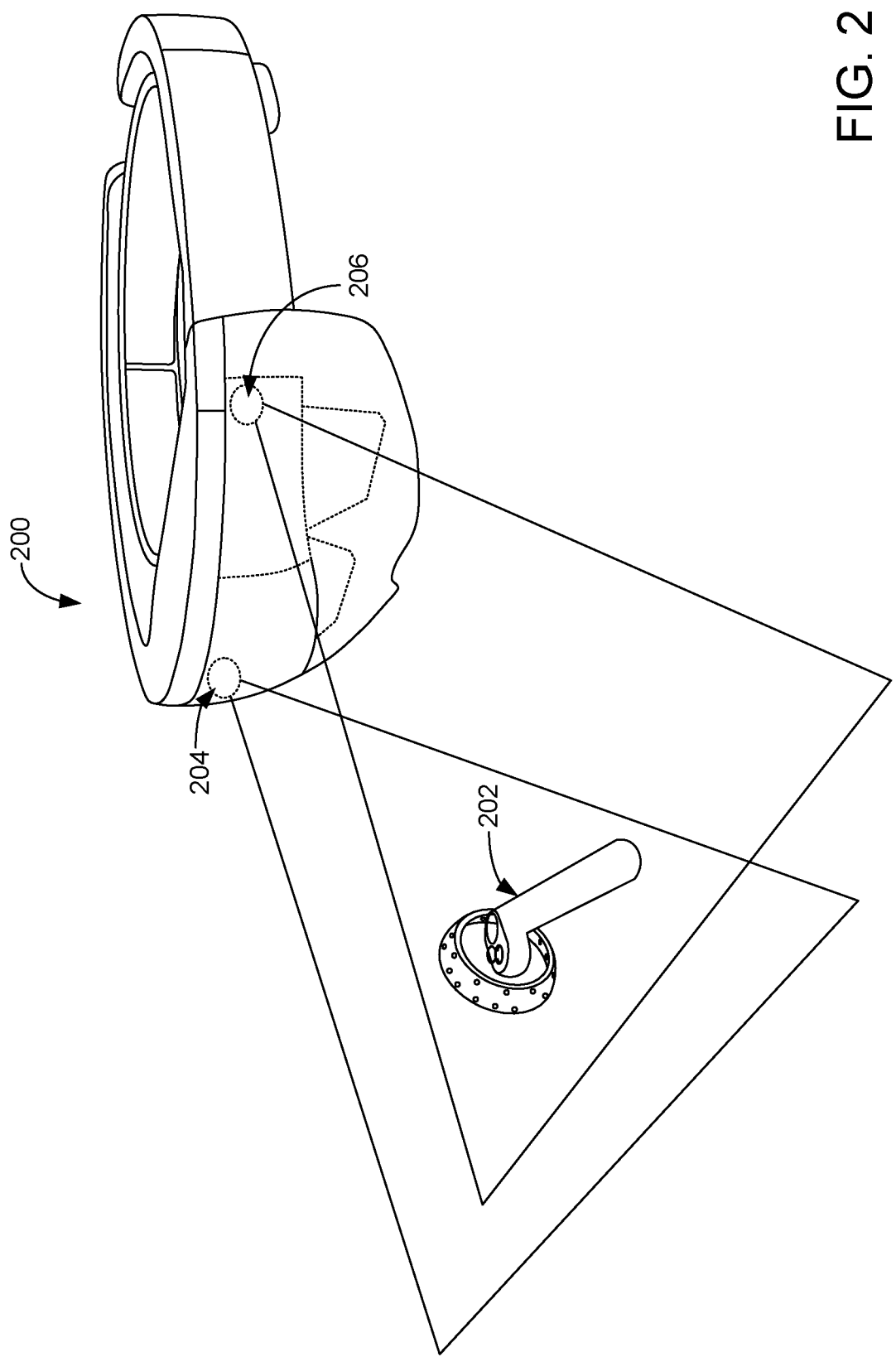
FIG. 2 shows an example wearable device imaging a handheld object.

FIG. 1 shows an example scenario 100 in which a HMD 102, worn by a user 104, displays virtual and/or augmented reality imagery. One or more outward-facing cameras on the HMD 102 may acquire image data (e.g. visible light image data) of the surrounding environment and of a handheld object 106 held by the user 102. For example, FIG. 2 shows an example HMD 200 imaging a handheld object 202 using a stereo camera imaging system (indicated by first camera 204 and second camera 206). Returning to FIG. 1, the cameras or other image sensing systems of the HMD 102 may have an associated field of view 112 in which the handheld object 106 may be imaged. FIG. 1 also depicts a second handheld object 124 held by the other hand of user 102 outside the field of view 112, where the second handheld object cannot be imaged by the image sensing systems of the HMD 102.

In the examples disclosed herein, the term "handheld object" is used for an object that may be held by hand and comprises feature points in the form of trackable light sources 108, and signifies that the object may be handheld, whether or not the object is currently in the state of being held in a hand. While the disclosed examples of handheld objects utilize feature points in the form of trackable light sources, other examples of handheld objects may utilize other forms of feature points, where such feature points may include markers, patterns and/or other fiducials that may be visually tracked.

The handheld objects 106, 124 are depicted as controllers, for example, for a video game system. The handheld objects 106, 124 may, in some examples, include an onboard processor, storage system, and communication system. In other examples, the handheld objects may not include one or more such systems, but may include lights or other identifiable feature points to assist in optical tracking of the handheld object. The handheld objects 106, 123 also may include one or more input controls, such as a button, trigger, joystick, directional pad, touch screen, etc. The handheld objects 106, 124 comprise an inertial measurement unit (IMU) (which may include an accelerometer, gyroscope, magnetometer, and/or other suitable sensors) that provides output related to changes in position and orientation of the handheld objects. In some examples, the HMD 102 may also include an IMU to help track changes in the HMD pose in the environment.

Figure 3:
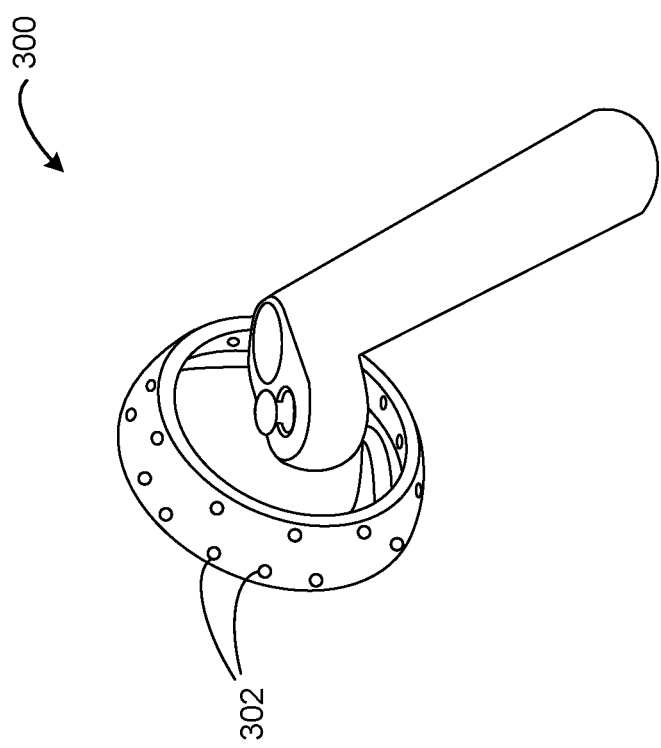
FIG. 3 shows a view of an example handheld object.

In the examples described herein, the handheld objects include feature points in the form of a plurality of light sources distributed over a surface of the handheld object. FIG. 3 shows an example handheld object 300 having a plurality of light sources 302 distributed along both an exterior and interior of a ring-like structure of the handheld controller 300. The light sources are configured to form patterns of light ("constellations") in image data acquired by an image sensing system, such as one or more cameras of the HMD, such that a pose of the handheld object may be determined from an image capturing the controller. The light sources may take any suitable form, such as light-emitting diodes (LEDs) that emit visible light for detection via a visible light camera or cameras on the HMD. Infrared light sources also may be used. In some examples, the camera(s) on the HMD may be configured to filter wavelengths of light other than those emitted by the LEDs to reduce noise levels in the image data. A handheld object may have any suitable number and arrangement of light sources.

Figure 4:
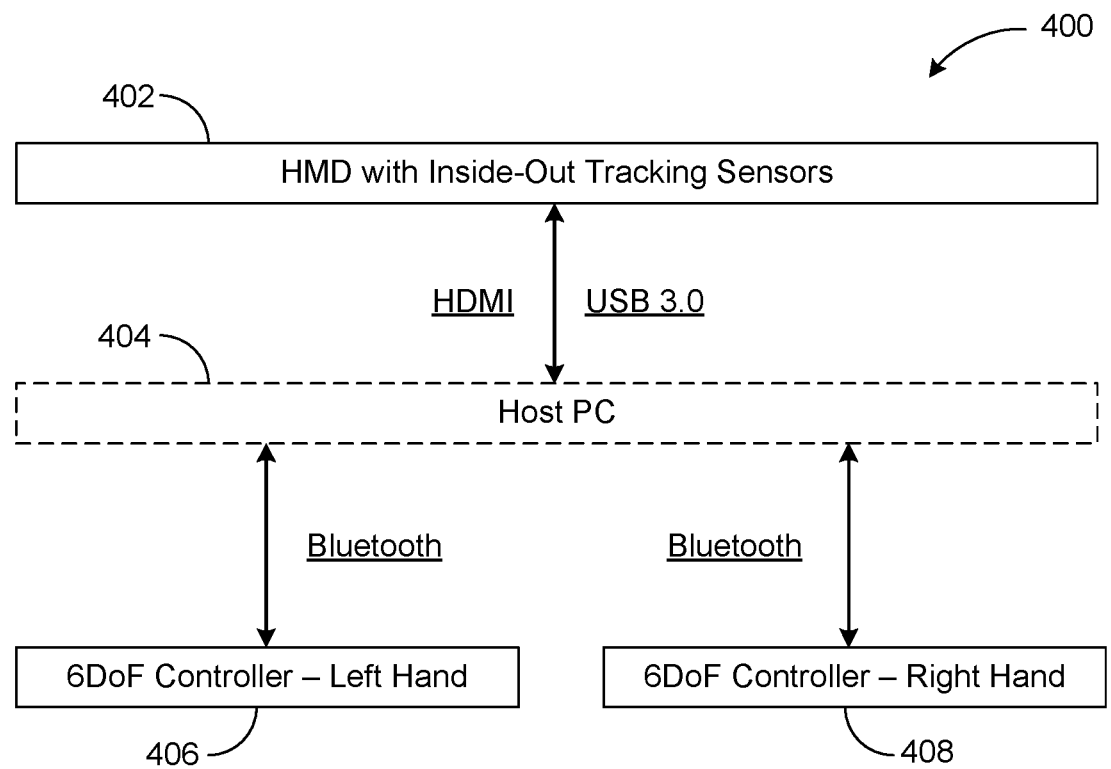
FIG. 4 shows an example computing system architecture for tracking a handheld object via a wearable device.

With reference again to FIG. 1, in some examples the HMD 102 and handheld objects 106/124 may be configured to communicate with one another directly, such as via a wireless network connecting utilizing a Bluetooth communication protocol or other suitable wireless communication protocol. In other examples, an optional host computing device 110 may communicate with the HMD 102 and the handheld objects 106/124 to receive data from HMD 102 and handheld objects (including image data acquired by the HMD and IMU data from the handheld objects), to process such data, and to send control signals to these devices. FIG. 4 shows an example computing system architecture 400 including an HMD 402 with tracking sensors, a host PC 404, a left handheld controller 406 and a right handheld controller 408, wherein each controller provides six degrees of freedom (6DoF). Each of the left handheld controller 406 and the right handheld controller 408 is depicted as communicating with the host PC 404 via Bluetooth. In other examples, other wired or wireless communication protocols may be utilized. For example, for factory calibration purposes the controllers may be communicatively coupled to the host PC 404 via USB (Universal Serial Bus) connection. Similarly, the host PC 404 may communicate with the HMD 402 and via any suitable wireless or wired communication protocol. Examples are illustrated as HDMI (High Definition Multimedia Interface) and USB.

As mentioned, host PC 404 is optional, and each of the handheld controllers 406 and 408 may communicate directly with the HMD 402 in some examples. It will be understood that while disclosed herein in the context of handheld controllers, any suitable handheld or movable object may be tracked. Likewise, the specific communication channels shown in FIG. 4 are presented for the purpose of example, and any other suitable communications channels, wired and/or wireless, may be used for HMD-to-host communication, host-to-handheld controller communication, and/or HMD-to-controller communication.

With reference again to the example of FIG. 1, a relative-to-HMD pose (position and orientation) of the handheld object 106 may be estimated by tracking the positions of light from the light sources on the handheld object 106 using the one or more cameras on the HMD 102. Data from the IMU on the handheld object 106 further informs tracking and may be used to provide more precise trajectories of the handheld object. The image data from the HMD camera(s) is used to derive optical pose data that represents a pose of the handheld object 106 relative to the HMD 102, while the IMU in the handheld object senses the forces proportional to the change in position and orientation in its body frame relative to the inertial frame.

Figure 5:
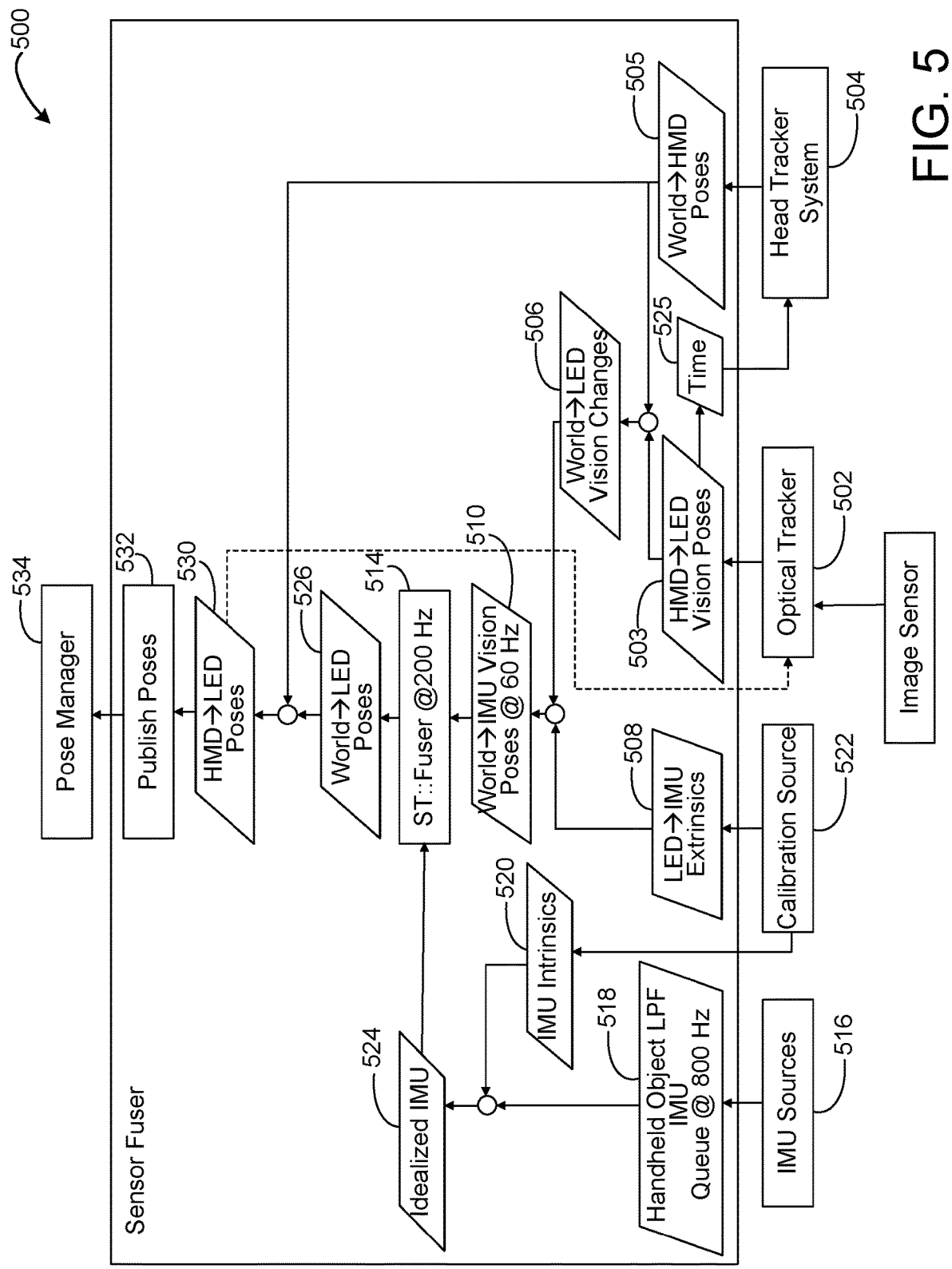
FIG. 5 shows an example processing system operable to derive the pose of a handheld object and HMD with respect to real world coordinates.

With reference now to FIG. 5, to combine the optical pose from image data with the IMU data to provide the actual pose of the handheld object 106 relative to the world, processing may be used to "fuse" the IMU data with the optical data by mapping the optical data to world coordinates. FIG. 5 shows a block diagram of an example processing system 500 that may be used to derive the pose of the handheld object and HMD with respect to real world coordinates from IMU data from the handheld object, and image and/or IMU data from the HMD. The processing system 500 may be implemented via any suitable hardware, including but not limited to the HMD, the handheld object, a host computing device in communication with the HMD and/or the handheld object, or distributed among multiple of these devices and/or other devices.

In the depicted system 500, the HMD receives image data capturing the surrounding environment and the handheld object(s) in the scene via an image sensor located on the HMD. Image data used to track the surrounding environment is referred to herein as "environmental tracking exposures" and image data used to track handheld object(s) is referred to herein as "handheld object tracking exposures." Various example methods of acquiring these exposures are described in more detail below.

An optical tracker 502 of the HMD analyzes the image data and outputs data regarding the pose of the handheld object (or each handheld object, where multiple handheld objects are detected) with respect to the HMD ("HMD→LED Vision Poses" 503) by visually tracking the position and orientation of the handheld object per frame using the handheld object tracking exposures. Light sources may be identified in the image data, for example, by thresholding the image to find rough light source locations, and then fitting a statistical curve (e.g. a Gaussian function) to the thresholded images to locate the light source on a pixel or sub-pixel basis. Once the light sources in the image data are located, any suitable method may be used to determine the position and orientation of the handheld object, including but not limited to epipolar line fitting and rigid body transformation fitting based on the determined light source locations.

A head tracker system 504 provides a pose of the HMD relative to the world ("World→HMD Poses" at 505) by visually tracking the HMD relative to the background environment using the environmental tracking exposures. Any suitable method may be used to perform the environmental feature tracking. For example, environmental features may be tracked by performing image recognition on the environmental tracking exposures, e.g. to identify features such as edges in the image and then tracking changes in location of the features between environmental exposure frames.

The optical pose of the handheld object with respect to the HMD ("HMD→LED Vision Poses" at 503) and the optical pose of the HMD relative to the world ("World→HMD Poses" at 505) are used to determine a pose of the handheld object with respect to the world. The pose thus determined is also referred to as a 'visual pose" herein. This pose may be provided in the form of data representing changes in pose compared to a previous determination, as indicated at 506 ("World→LED Vision Changes"), or in any other suitable form. This data is adjusted via extrinsic calibration data (illustrated as "LED→IMU Extrinsics" at 508) regarding the light sources and IMU of the handheld object to produce "World→IMU Vision Poses" at 510.

Optical pose data regarding the pose of the handheld object ("HMD→LED Vision Poses" at 503) and the pose of the HMD ("World→HMD Poses" at 505), both visually observed from the perspective of the HMD, are further provided to a fuser 514. The fuser 514 takes the optical pose data and "fuses" it with IMU data received from the handheld object to provide an actual pose of the handheld object with respect to the environment.

IMU data is received from IMU sources 516 on the handheld object. The IMU data may represent six degrees of freedom. Because accelerometers and gyroscopes may have random errors which have a flat frequency response that spans the whole bandwidth, a low pass filter (LPF) at 518 may be used to reduce such noise by removing the high frequency components that may not be used for the operation. Filtering may be performed remotely (e.g. via a host PC) or locally, and the data also may be downsampled. The resulting IMU data then may be adjusted via intrinsic calibration data 520 (illustrated as calibration source 522) previously stored for the handheld object. Example intrinsic calibration data 520 includes data regarding stereo camera offset and relative camera positions. Such calibration data may be updated during system use. The resulting "Idealized IMU" data 524 is provided to the fuser 514 for fusing with the image data from the head tracker system and the optical tracker.

Time information 525 regarding when optical poses were measured is provided to the head tracker system 504. The head tracker system 504 may give a most probable World-→HMD pose at the time of when a corresponding HMD→LED vision pose is obtained so that the discrete time moments regarding when HMD→LED Vision Poses 503 and World→HMD Poses 505 are evaluated are sufficiently coincident.

As the visual pose data for the handheld object that is input to the fuser is relative to the external environment, and as the IMU data from the handheld object is in its body frame relative to the inertial frame, the fuser 514 may fuse these data and output the handheld object pose with respect to the world, shown as "World→LED Poses" at 526. The fuser 514 may fuse these data in any suitable manner, such as via the use of one or more filters, such as a Kalman filter.

As noted above, in some examples visual pose data and/or IMU data that is temporally out-of-order may be received by the fuser 514. As described in more detail below, in some examples multiple filters may be used to consume and fuse this data, with each filter governed by different policies for fusing data having different timestamps. In some examples, each filter may operate on discrete data at discrete time stamps, to help accommodate uncertainties with regard to correspondence in timing of the IMU data and the visual pose data.

The "World→LED Poses" 526 output by the fuser may be used to derive a relation of the HMD to the handheld object, shown as "HMD→LED Poses" 530. "HMD→LED Poses" data 530 then may be resulting from the fuser 514 may also be sent as feedback to the optical tracker 502 for motion prediction purposes to help predict an expected pose of the controller in a next frame based upon HMD motion and the handheld object pose. Pose data further may be published at 532 and sent to a pose manager 534.

Figure 6:
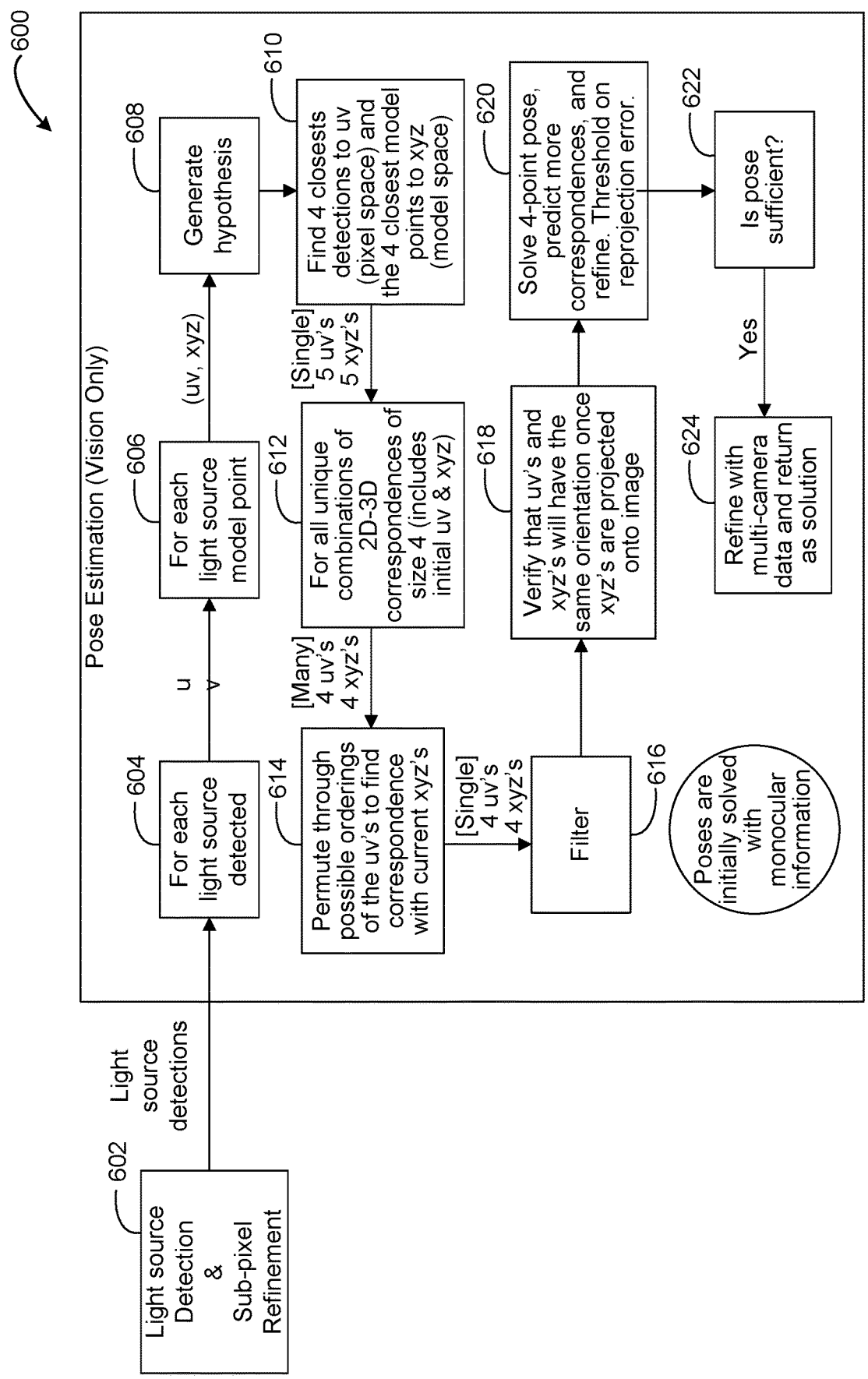
FIG. 6 shows a flow diagram illustrating an example method of estimating a pose of a handheld object.

FIG. 6 shows a flow diagram illustrating an example method 600 of estimating a pose of a handheld object. Method 600 may be performed, for example, by the optical tracker of an HMD, such as optical tracker 502 of FIG. 5, and may be performed separately for each camera of a stereo camera pair. Method 600 initially includes performing, at 602, light source detection and sub-pixel refinement. As mentioned above, light sources on the handheld object may be detected in handheld object tracking exposures of image data obtained from a camera. In each handheld object tracking exposure, multiple light sources may be detected. Each light source spot may cover multiple pixels. The relatively large size of the light spot may introduce uncertainty into the pose estimation. As such, a sub-pixel refinement may be performed to determine a most likely sub-pixel location for each light source in the image.

At 604, for each light source detected, a pixel location in the image for that light source is determined, represented by pixel coordinates u,v. Next, at 606, each two-dimensional u,v pixel may be mapped to a corresponding candidate three-dimensional data point x,y,z based on a three-dimensional coordinate frame system in space. At 608, the computing device may generate a hypothesis for the pose of the handheld object based on these light source correspondences. At 610, the computing device may determine four of the closest detections to the u,v pixel coordinates in pixel space and four of the closest model points to x,y,z in 3D model space. For unique combinations of 2D-3D correspondences of size 4 (referring to the four closest detections and model points), which includes the initial u,v and x,y,z coordinates (at 612), the computing device may permute through all possible orderings of the u,v's to find correspondence with x,y,z's, at 614. These possible orderings are then filtered, at 616, and further verified that u,v's and x,y,z's will have the same orientation once the x,y,z's are projected onto the image, at 618.

At 620, the computing device solves for a 4-point pose, which refers to the pose (translation and rotation) obtained by evaluating a correspondence of size 4. The computing device further predicts more possible uv-xyz correspondences and refines these predictions. The predictions are thresholded on a reprojection error, the error between 2D detection points (u,v's) and the prediction of associated 3D points (x,y,z), assuming a certain pose. At 622, the solution is evaluated to determine a likelihood of that solved pose as sufficiently matching the observed data. If the pose is determined to be sufficient, the computing device further refines the pose with multi-camera image data and returns the final pose as the solution, at 624. For example, because the HMD may have more than one camera, a pose may be solved for each camera on the HMD. Such refinement is performed as postprocessing of a multitude of poses obtained from different cameras. In other examples, any other suitable pose estimation process may be used.

Figure 7:
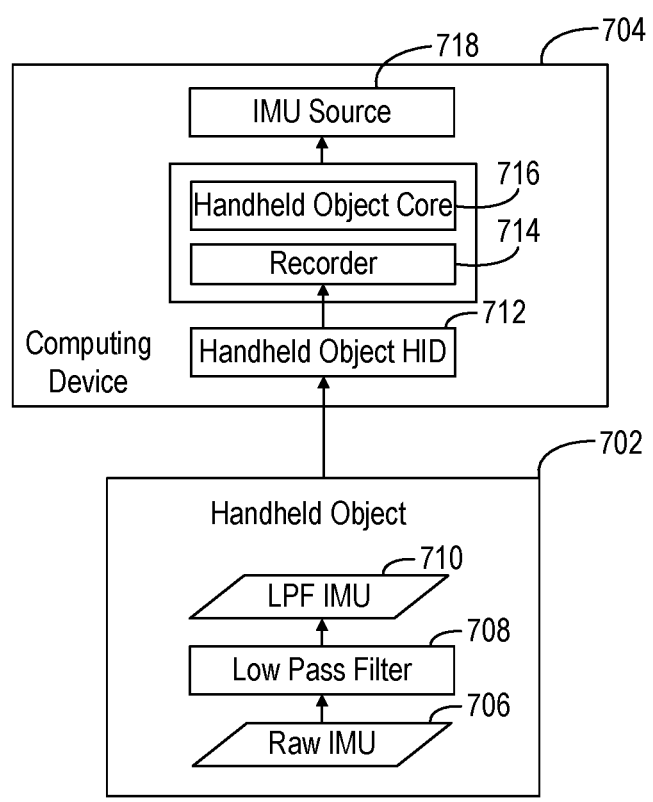
FIG. 7 illustrates an example of processing IMU data on a handheld object and on a host computing device.

FIG. 7 shows a flow diagram illustrating example processing of IMU data on a handheld object 702 and on another computing device 704 to which the IMU data is sent, such as a host PC or HMD. IMU source 718 is an example of IMU sources 516 of FIG. 5. Raw IMU data 706 from the handheld object 702 is filtered using a low pass filter 708, as described above, and downsampled for sending to the other computing device 704. The low-pass-filtered IMU data 710 is received at a handheld object human interface device (HID) 712 of the host computing device 704 and is further processed by a recorder 714 and handheld object core 716 to produce the data provided as IMU source 718.

In some examples, the handheld object may assign timestamps to data from the handheld object sensors (e.g. IMU data), and the HMD may assign timestamps to data from the HMD sensors (e.g. IMU and image data). In other examples, a host computer may apply timestamps to data it receives from both the HMD and the handheld object. As noted above, in some examples the handheld object 702 may send IMU data to the computing device 704 via Bluetooth or other wireless communication protocol. In these examples, the unreliability of such wireless network transports, network communication round-trip time uncertainties, and/or other factors can cause data synchronization problems. In some examples, the HMD clock domain and the handheld object clock domain can become unsynchronized at times.

In these examples, time uncertainty may be introduced by factors including data travel time over Bluetooth. For example, due to unreliable wireless transport mechanisms and potentially congested radio frequency conditions, the Bluetooth radio may automatically and periodically adjust its transmission time and/or signal strength. In congested RF conditions, for example, data packets may arrive consistently later as compared to normal, uncongested RF conditions. Other factors that also may introduce time uncertainties include delays in data sending at the HMD, delays in data sending at the handheld object, and delays in data recognition at the host PC. One or more of these uncertainties can result in out-of-order, delayed, skipped, and/or missing data, which can correspondingly result in incorrectly fused data and attendant negative impacts on the user experience, such as increased jitter, higher latencies and other issues.

Accordingly, computing devices and corresponding methods are disclosed herein for determining poses of a handheld object in a manner that accounts for out-of-order, delayed, skipped, and/or missing data. As described in more detail below, by utilizing multiple filters to produce updated poses of a handheld object, aspects of a user's experience, such as accuracy, latency, and jitter, may be controlled in a manner that effectively manages out-of-order, delayed, skipped, and/or missing data.

Figure 8A:
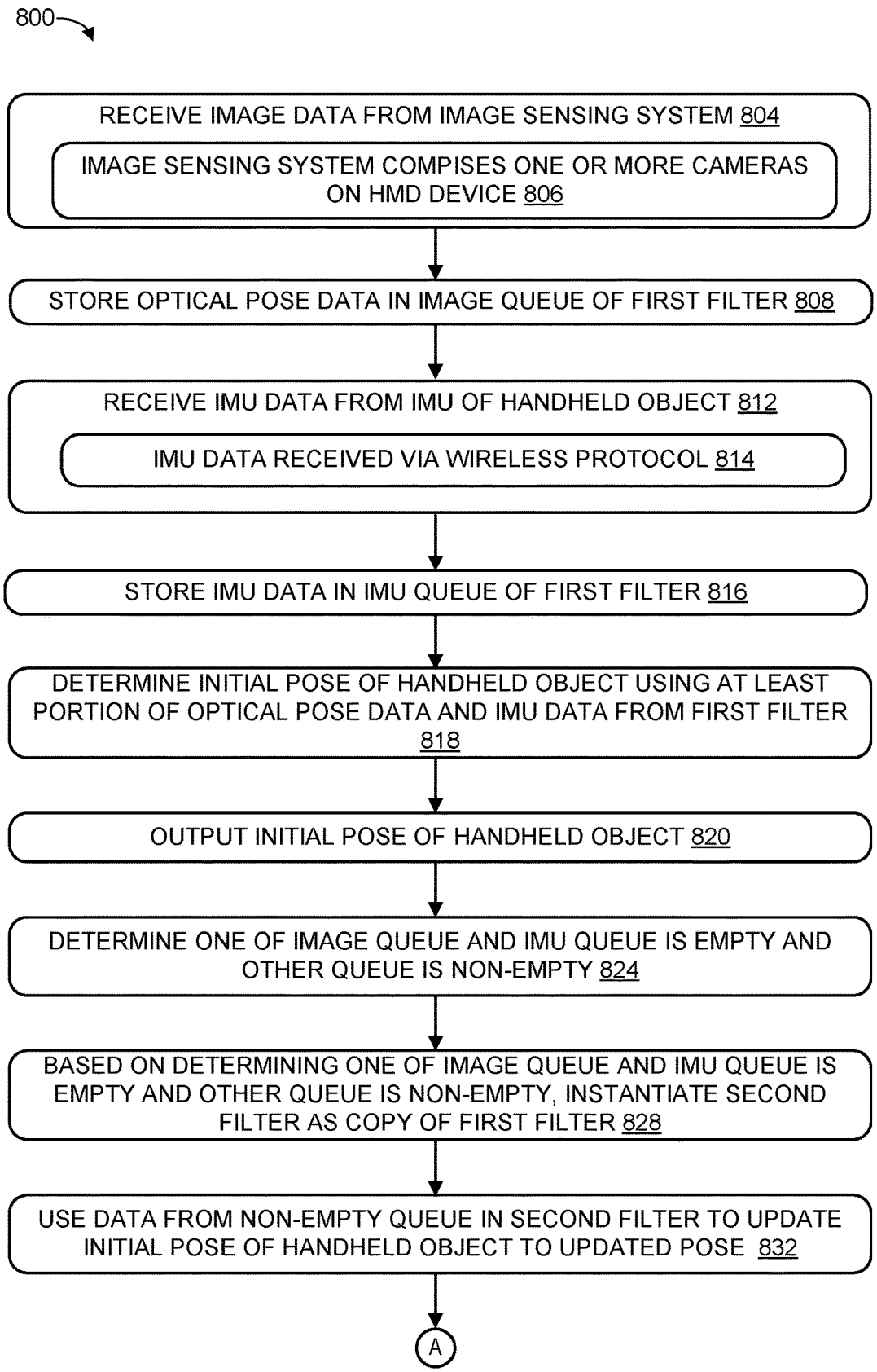
FIGS. 8A, 8B and 8C show a flow diagram illustrating an example method of determining poses of a handheld object according to examples of the present disclosure.

With reference now to FIG. 8, an example of a method 800 for tracking a pose of a handheld object is illustrated. One or more aspects of the method 800 may be performed by the fuser 514 and/or other components and features of the processing system 500 described herein. At 804, the method 800 may include receiving image data of the surrounding environment from an image sensing system. As noted above, in different examples the image data may be received from one or more cameras of an HMD or from externally mounted cameras in the environment. In one example, at 806 the image sensing system comprises one or more cameras on an HMD device. As described in more detail in the examples discussed below, at 808 the method 800 may include storing optical pose data derived from the image data in an image queue of a first filter. At 812, the method 800 may include receiving IMU data of the surrounding environment from an IMU of the handheld object. At 814 the method 800 may include wherein the IMU data is received via a wireless protocol. At 816 the method 800 may include storing the IMU data in an IMU queue of the first filter.

Figure 9:
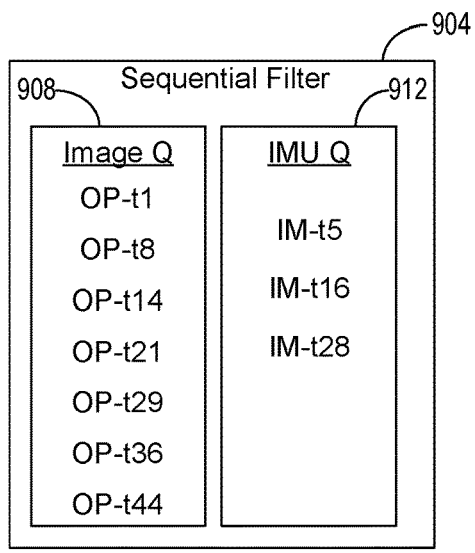
FIGS. 9-11 and 13 schematically show examples of a first filter and instantiation of a second filter for receiving and processing sensor data.

With reference now to FIG. 9, in one example the first filter may comprise a sequential filter 904 that includes an image queue 908 and an IMU data queue 912. As described in more detail below, the image queue 908 may store optical pose data in the form of optical poses (OP), and the IMU queue 912 may receive and store IMU data (IM). Each optical pose and reading of IMU data comprises a timestamp (t #) that indicates a time at which the pose or reading was determined or sampled. In the drawings of the present disclosure, each optical pose and IMU measurement in a queue is shown with its corresponding timestamp, with higher numbers indicating later capture/sample times.

With reference again to FIG. 8A, at 818 the method may include determining an initial pose of the handheld object using at least a portion of the optical pose data and at least a portion of the IMU data from the first filter. At 820, the initial pose of the handheld object may be outputted (published). For example, the initial pose may be published to the pose manager 534 for use by an application that is tracking the handheld object. With reference again to FIG. 9, in some examples the sequential filter 904 is configured to sequentially consume the optical pose data from image queue 908 and IMU data from the IMU queue 912 in the order received. Additionally and as described in more detail below, the sequential filter 904 is configured to require data in both queues before proceeding to consume the data and publish a new pose.

Figure 10:
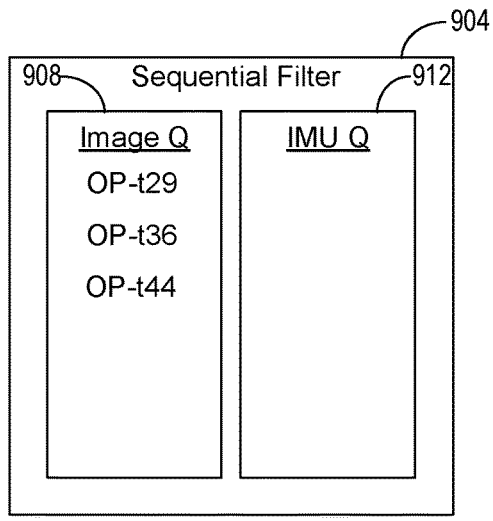

In the example of FIGS. 9 and 10, the sequential filter 904 proceeds to consume in temporal order OP-t1, IM-t5, OP-t8, OP-t14, IM-t16, OP-t21 and IM-t28. Upon consuming each temporal exposure or IMU reading, the current internal pose of the handheld object is updated, and this updated pose is published. In this manner, the sequential filter is configured to update the pose of the handheld object in a temporally sequential fashion that ensures that each portion of data consumed was captured or sampled later than the previous portion of data consumed.

However and as noted above, in some examples and for a variety of reasons, data may be received out-of-order, delayed, skipped, or may be missing entirely. For example, where the handheld object is moved outside a field of view of the image sensing system for a period of time, image data of the object will not be received. Similarly, wireless transport mechanisms such as Bluetooth that communicatively couple the handheld object to the host computing device or HMD may be unreliable, and may experience delays and periodic outages due to a variety of factors. As a result, IMU data from the handheld object may be delayed and received out-of-order relative to the image data. It follows that where a pose has been generated and published using data having a given timestamp, and out-of-order data is later received having an earlier timestamp, publishing an updated pose incorporating the earlier data could cause anomalous tracking results and undesirable user experiences.

With respect to the sequential filter 904, in some examples these potential timing uncertainties may result in an empty image queue 908 or an empty IMU queue 912. For example, at a certain point after time t28 the sequential filter 904 stops receiving new IMU data while it continues to receive image data OP-t29, OP-t36 and OP-t44. In this example and as shown in FIG. 10, after consuming and publishing poses that incorporate OP-t1, IM-t5, OP-t8, OP-t14, IM-t16, OP-t21 and IM-t28, the image queue 908 may contain image data OP-t29, OP-t36 and OP-t44 while the IMU queue 912 is empty. Additionally and in this example, the temporally next IMU data measurement (IM-t40) has been sampled, but its transmission and receipt are delayed due to one of the wireless transport conditions discussed above.

In this example, if the sequential filter 904 proceeds to consume and publish updated poses based on OP-t29, OP-t36 and OP-t44, when delayed IMU data IM-t40 is received in IMU queue 912, updating and publishing the pose with this earlier measurement will cause the tracking problems noted above. Accordingly and to avoid such problems, the sequential filter 904 is configured to require data in both queues before it can proceed to consume the data and publish a new pose. In the example of FIG. 10, because the IMU queue 912 is empty, the sequential filter 904 will wait for another IMU measurement to be received in IMU queue before proceeding to update and publish new poses with the image data in the image queue 908. In this manner, data consumed by the sequential filter 904 is guaranteed to be in temporal order, resulting in temporally accurate updated poses.

However, while the sequential filter 904 waits for data to be received in the empty queue, the currently published pose becomes increasingly stale and inaccurate. This in turn causes increased tracking latency and poor user experiences. Further, even though new image data continues to be received in image queue 908, the sequential filter 904 remains blocked and the next updated pose will not be published until an IMU measurement is received.

Figure 11:
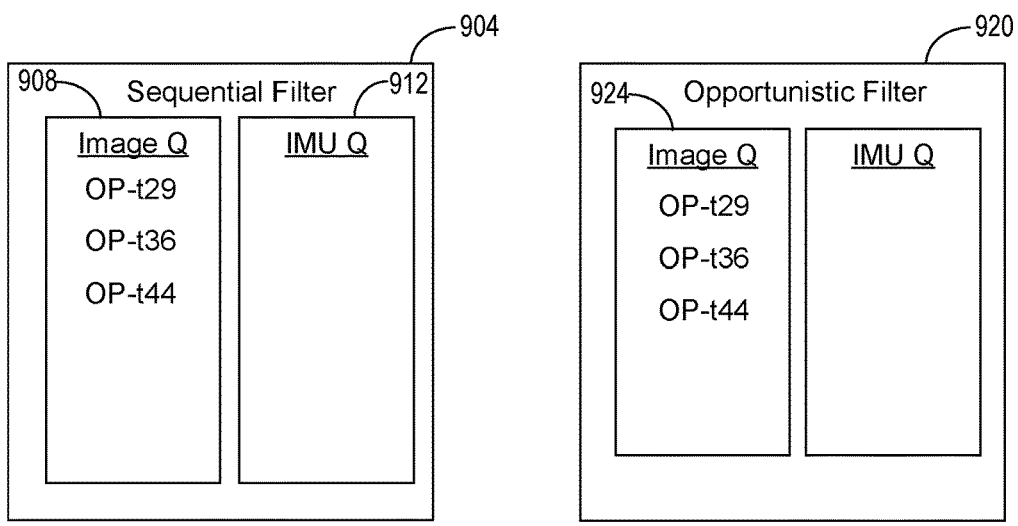

Accordingly, and in one potential advantage of the present disclosure, when either the image queue 908 of the IMU queue 912 is empty, a second, opportunistic filter may be instantiated as a copy of the current sequential filter and comprising the empty queue and the other non-empty queue. FIG. 11 shows an example of an opportunistic filter 920 that is a direct copy of the sequential filter 904. Further, the opportunistic filter may be configured to consume all of the data in its non-empty queue without waiting for additional data to be received. In this manner, the opportunistic filter may update the internal (non-published) pose of the handheld object using the most recently received data from the non-empty queue.

Figure 13:
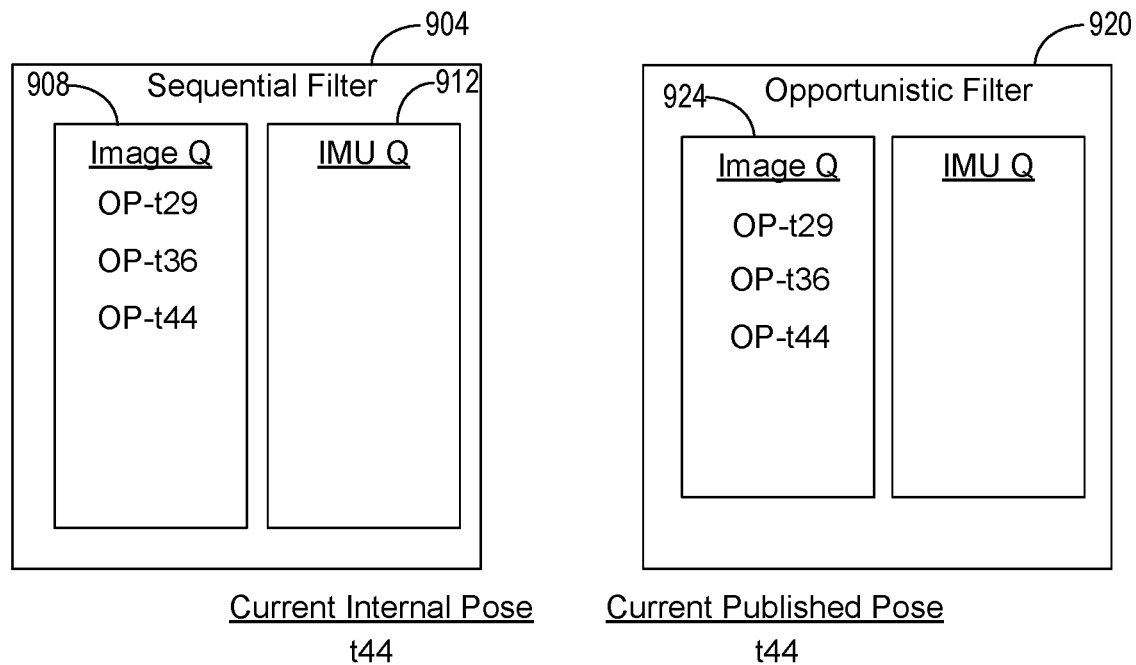

In the present example and with reference now to FIG. 13, the opportunistic filter 920 may consume the data in its image queue 924 to update the current internal pose of the handheld object. The pose timestamp t44 of the current updated internal pose (corresponding to the most recent image data OP-t44 consumed to update the pose) is also indicated. In some examples, the opportunistic filter 920 also may be updated to include new data subsequently received in the non-empty image queue 908 of the sequential filter 904 while waiting for data to be received in the empty IMU queue 912 queue of the sequential filter 904.

Accordingly and with reference again to FIG. 8A, at 824 the method 800 may include determining that one of the image queue and the IMU queue is empty and the other queue is non-empty. At 828 the method 800 may include, based on determining that one of the image queue and the IMU queue is empty and the other queue is non-empty, instantiating a second filter as a copy of the first filter comprising the one empty queue and the other non-empty queue. At 832 the method 800 may include using the data from the non-empty queue in the second filter to update the initial pose of the handheld object to an updated pose of the handheld object. Additionally and as described in more detail below, the opportunistic filter may proceed to publish the updated pose. Accordingly and with reference now to FIG. 8B, at 834 the method 800 may include outputting the updated pose of the handheld object. In the example of FIG. 13, the pose timestamp t44 of the current published pose is also indicated.

In this manner, and in one potential advantage of the present disclosure, instantiating and utilizing the opportunistic filter 920 as described above allows poses to be updated and published while the sequential filter 904 waits for additional data to be received in the empty queue. This enables the system to continue publishing updated poses opportunistically while also maintaining the temporal policies and corresponding advantages of the sequential filter 904.

Additionally and as noted above, while the opportunistic filter may continuously update the current internal pose of the handheld object, in some examples it may be desirable for the opportunistic filter to wait for a timeframe to expire before publishing an updated pose. For example and as noted above, where a pose has been generated and published using data having a given timestamp, and subsequently data is received having an earlier timestamp, publishing an updated pose incorporating the earlier data could cause anomalous tracking results and undesirable user experiences. Accordingly, and with reference again to FIG. 8B, at 836 the method 800 may include waiting for a timeframe to expire before outputting the updated pose of the handheld object. In this manner, delayed and out-of-order data are more likely to be received and consumed before publishing an updated pose. Next and at 840 the method 800 may include, based on determining that the timeframe has expired, outputting the updated pose of the handheld object.

However, it is also desirable to minimize latency by promptly consuming and publishing newly received data. Accordingly, shorter waiting timeframes may be more advantageous to address this consideration. On the other hand, as the waiting timeframe is shortened, the likelihood of prematurely publishing inaccurate poses that do not include delayed/out-of-order data increases. This in turn can negatively impact accuracy and increase jitter.

Accordingly, in different examples the methods of the present disclosure may determine the waiting timeframe in a manner that balances latency and jitter considerations to provide pleasing user experiences. Returning to FIG. 8B and in some examples, at 844 the method 800 may include determining a length of the timeframe based on whether the empty queue is the image queue or the IMU queue. In these examples, aspects of different data transport mechanisms for the two queues may be used to determine an appropriate length for the timeframe.

For example and with reference again to FIG. 4, image data from the HMD may be received by the host PC 404 via a wired data protocol such as HDMI or USB 3.0. Given the reliability of these transport mechanisms, the expected frequency of receiving image data may be highly predictable. For example, where a camera of the HMD operates at a capture rate of 60 Hz, image data may be expected with high certainty to arrive via USB 3.0 every 16.66 ms. Further, given the high reliability of these transport mechanisms, the likelihood of receiving delayed or out-of-order image data is minimal. It follows that any tracking exposures that do not include the handheld controller correspond to situations in which the controller is obscured or out of the field of view of the HMD camera(s), as opposed to delayed data that may be received later. Accordingly, in examples where the image queue 908 of the sequential filter 904 is the empty queue, the timeframe for waiting to publish the updated pose from the opportunistic filter 920 may be set to a capture rate of the image sensing system. In the above example, the timeframe may be set to approximately 16.66 ms. It will be appreciated that in other examples, other timeframe lengths may be utilized corresponding to different types of image capture devices having different capabilities.

Figure 12:
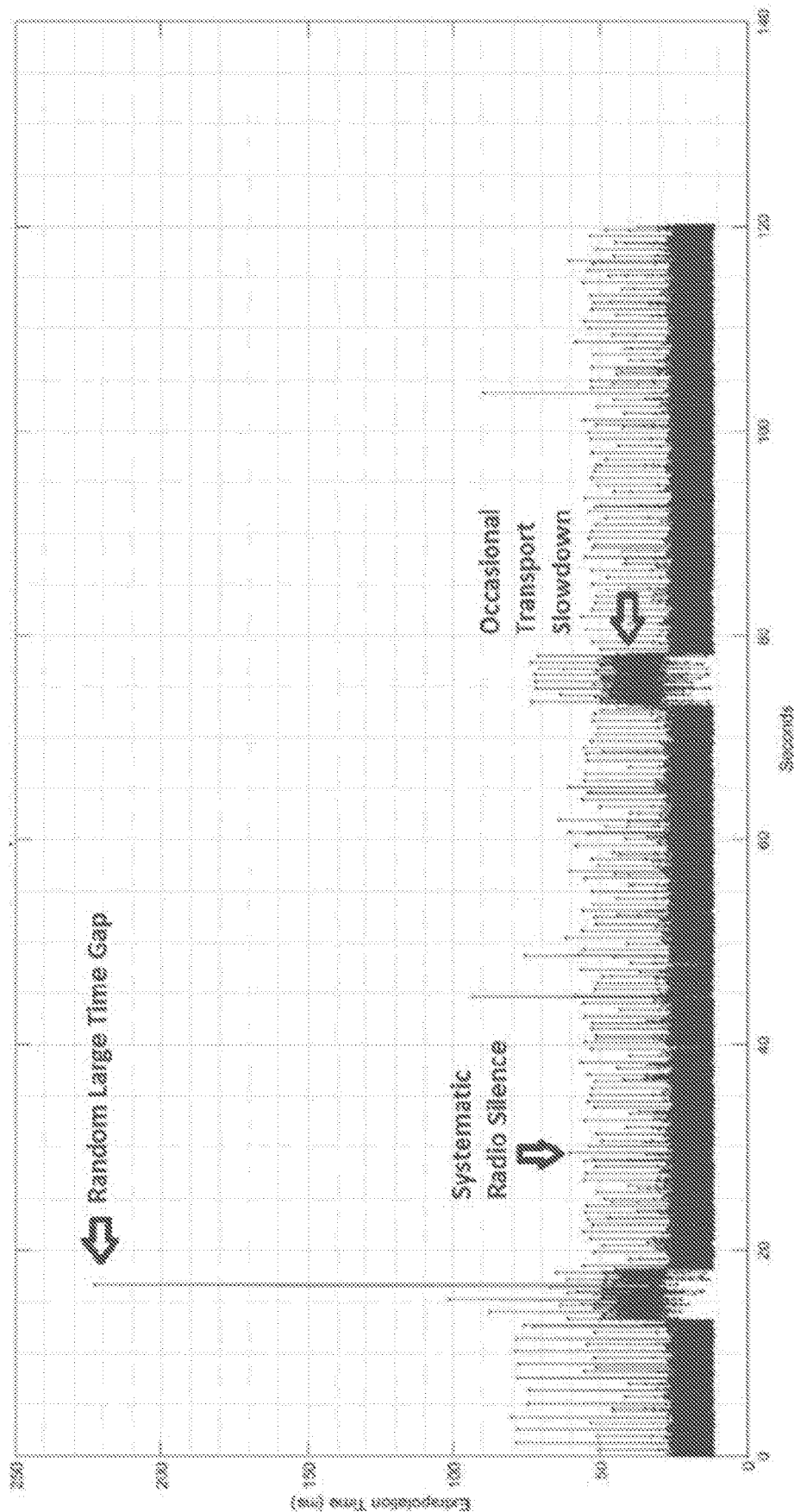
FIG. 12 shows a plot of time difference between consecutive IMU measurements received by a host processing unit.

In other examples where less reliable data transport mechanisms are used, different techniques for determining the length of the timeframe that address corresponding timing uncertainties may be utilized. For example and as noted above, Bluetooth systems may experience periodic data transmission delays due to a variety of factors. With reference now to FIG. 12, an example plot of time differences between consecutive IMU measurements received via Bluetooth by a host processing unit is illustrated. As shown in this example, over the 120 secs of receiving data the time between consecutive IMU measurements is most commonly within approximately 25 ms. Occasional transport slowdowns and individual outliers between approximately 25 and 50 ms, and less frequently between approximately 75 and 100 ms, are also observed. These outliers may correspond to systematic radio silence events. This sample also includes one random large time gap of approximately 225 ms.

As noted above, waiting for a timeframe to expire before outputting an updated pose of the handheld object can increase the likelihood that delayed and out-of-order data are received and consumed before an updated pose is published. However, promptly consuming and publishing newly received data is also desirable to minimize latency. With reference again to the example of FIG. 12, as the most common maximum time difference between consecutive IMU measurements is around 25 ms, setting the waiting timeframe to 25 ms would capture a majority of the IMU data before publishing updated poses. However, in this example occasional transport slowdowns lasting 4 to 5 seconds are experienced in which the time difference between consecutive measurements significantly increases to as much as 50 ms. Accordingly, if the timeframe were set to 25 ms, during these slowdowns updated poses that do not include the most recent IMU measurements would be published.

In another approach and to prioritize capturing more IMU data for use in updating poses, the waiting timeframe could be extended and set to 50 ms. In this manner, all of the IMU data except the relatively few outliers received more than 50 ms after the previous measurement would be captured and used. However, waiting 50 ms to publish updated poses would significantly increase latency.

Accordingly, where an unreliable transport mechanism is utilized for data delivery, in some examples of the present disclosure a classifier may determine a length of the waiting timeframe based on previous time differences between consecutive measurements of the IMU data. With reference again to FIG. 8B, at 848 the method 800 may include adjusting a length of the timeframe based on time differences between consecutive measurements of the IMU data during a preceding time window. Additionally and at 852 the method 800 may include adjusting the length of the timeframe at a predetermined frequency.

For example, where the preceding time window is 5 seconds, at time T0 the previous time differences between consecutive measurements of the IMU data may be averaged over the previous 5 seconds to yield an average time difference. The length of the waiting timeframe may then be adjusted to the average time difference at time T0. The system may recalculate this average time difference at a predetermined frequency, such as 1 Hz. It will be appreciated that the foregoing is merely an example for illustrative purposes, and other suitable time windows and recalculation frequencies may be utilized based on a variety of factors.

Accordingly, by utilizing a preceding time window in this manner, the waiting timeframe may be dynamically adjusted to account for occasional transport slowdowns, systematic radio silences, random large time gaps and other timing variables. Further, by averaging the previous time differences between consecutive measurements of the IMU data over the preceding time window, a balance between acceptable levels of jitter and acceptable latencies may be achieved.

In some examples, the size of the preceding time window may be determined using historical data of time differences between consecutive measurements of the IMU data. For example and with reference to the plot of FIG. 12, as the two occasional transport slowdowns each last for a period of approximately 5 seconds, this period may be used as the length of the preceding time window. In other examples, and in addition to or instead of such historical data of time differences between consecutive measurements, other factors may be considered for setting the size of the preceding time window, such as user preferences regarding jitter and latency, application requirements for optimizing for either low jitter or low latency, and other factors.

As noted above, in some examples earlier data that has been delayed may be received after an updated pose including later data has been published. In some examples, such earlier data may be consumed to update the current internal pose of the handheld object, while the system also refrains from immediately publishing such updated internal pose. Accordingly and with reference again to FIG. 8B, at 856 the method 800 may include, wherein the updated pose is a first updated pose (a current internal pose) of the handheld object, after outputting the first updated pose from the second filter, receiving prior IMU data having a data timestamp earlier than a pose timestamp of the first updated pose. At 860 the method 800 may include populating the IMU queue of the first filter with the prior IMU data. At 864 the method 800 may include using the prior IMU data to update the first updated pose to a second updated pose (an updated current internal pose).

Figure 14:
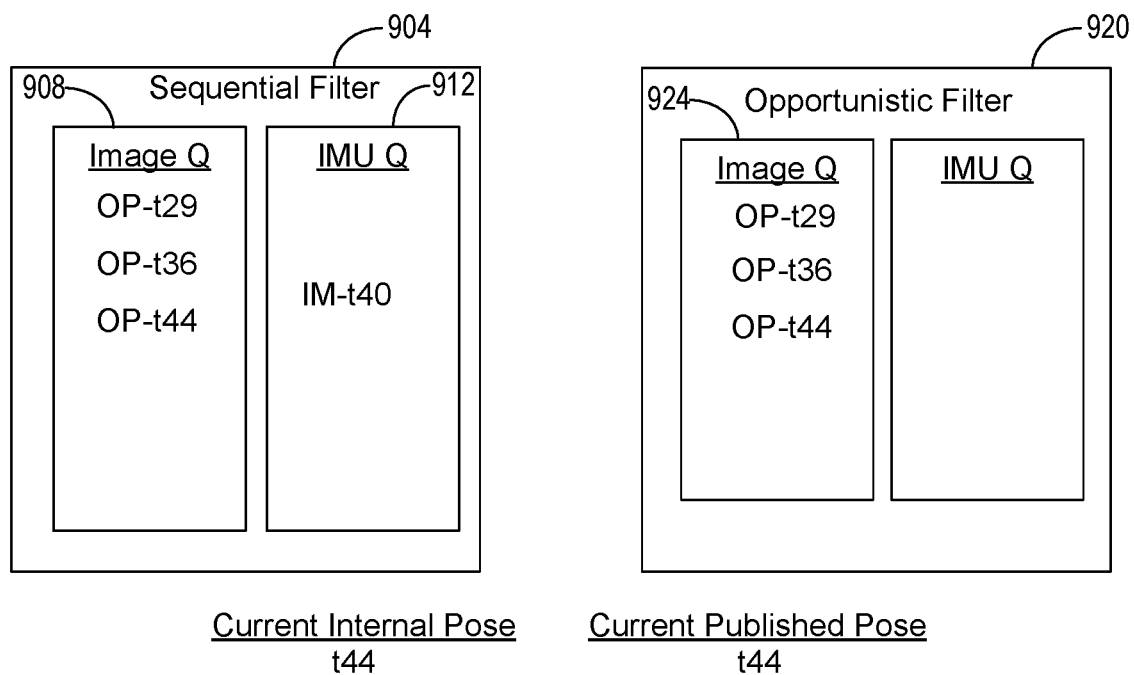
FIGS. 14 and 15 schematically show an example of updating a current internal pose from the first filter and refraining from publishing the updated current internal pose.

With reference to FIG. 14, in this example the opportunistic filter has consumed the image data from its image queue 924 to update the current internal pose to current internal pose timestamp t-44. The opportunistic filter 920 also has published the current internal pose t-44 as indicated by current published pose t-44. Subsequently and after current published pose t-44 is published, earlier delayed IMU data IM-t40 is received in the IMU queue 912 of the sequential filter 904. At this point the sequential filter 904 has data in both image queue 908 and IMU queue 912. Thus and according to its configuration, the sequential filter 904 could proceed to update the current internal pose t44 with the delayed IMU data IM-t40 and to publish this updated pose. However, as the current published pose t44 includes data having a later timestamp than the delayed IMU data IM-t40, updating the current published pose t44 with earlier IMU data IM-t40 could result in incorrectly fused data and cause unexpected and erroneous output.

Figure 8B:
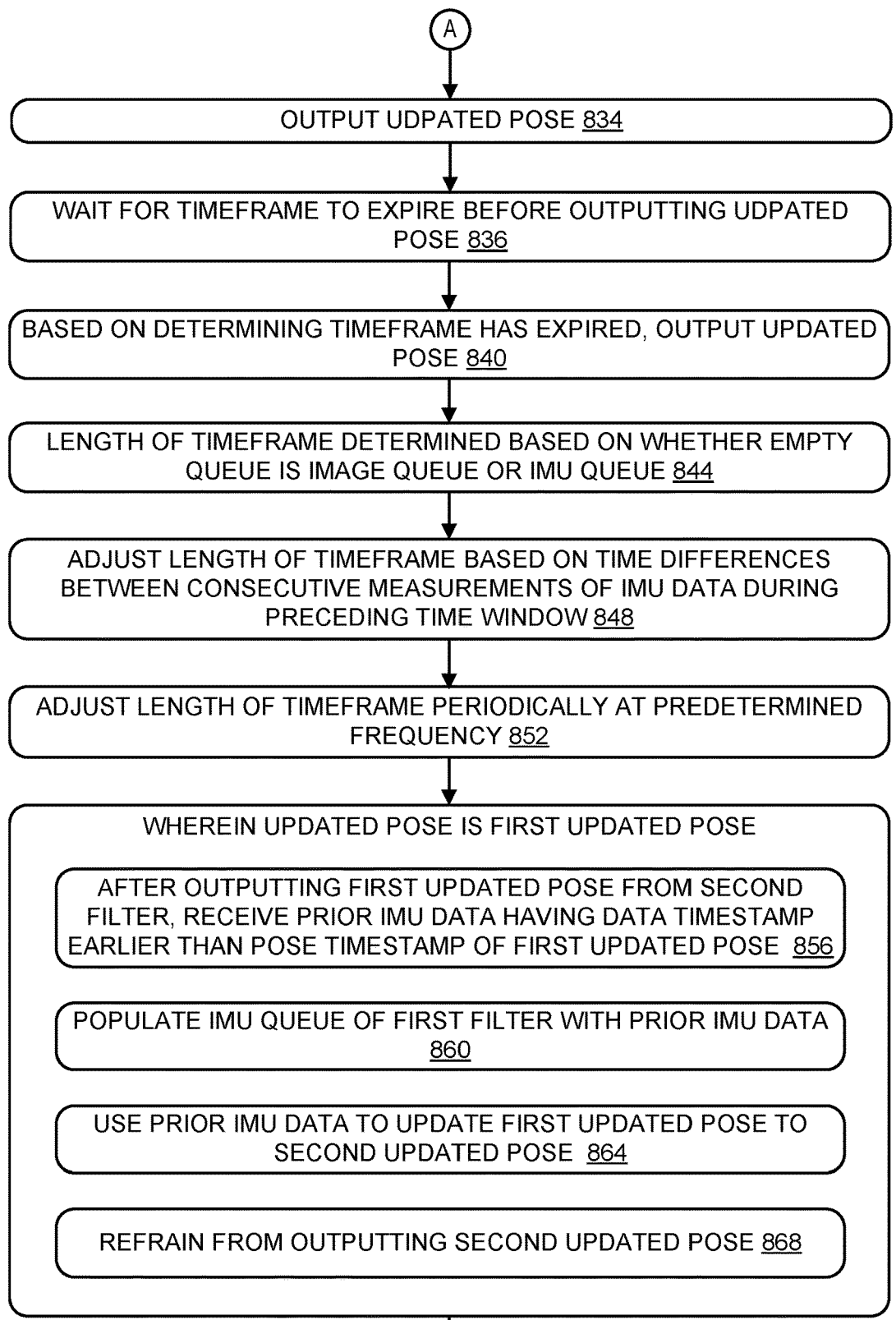
Figure 15:
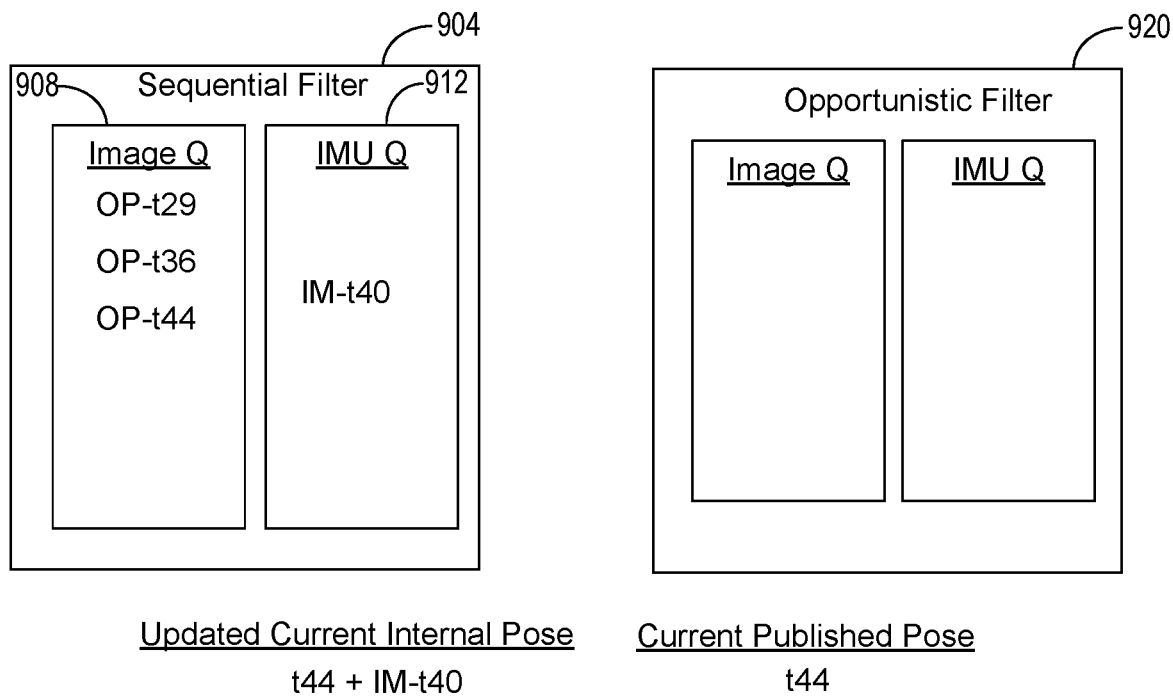

Accordingly and with reference also to FIG. 8B and steps 864 and 868, in some examples the earlier IMU data IM-t40 may be used to update the current internal pose to an updated current internal pose, while also refraining from publishing this updated current internal pose. For example, the system may wait to publish the current internal pose until the timestamp of such pose is later than the timestamp of the current published pose. FIG. 15 illustrates this example where the current internal pose is updated using delayed data IM-t40 to an updated current internal pose denoted t44+IM-t40, and such updated current internal pose is not immediately published. In this manner, newly received delayed or out-of-order data may be consumed to improve the accuracy of the current internal pose, while also waiting to publish an updated pose until the timestamp of the current internal pose catches up with the timestamp of the current published pose.

Figure 16:
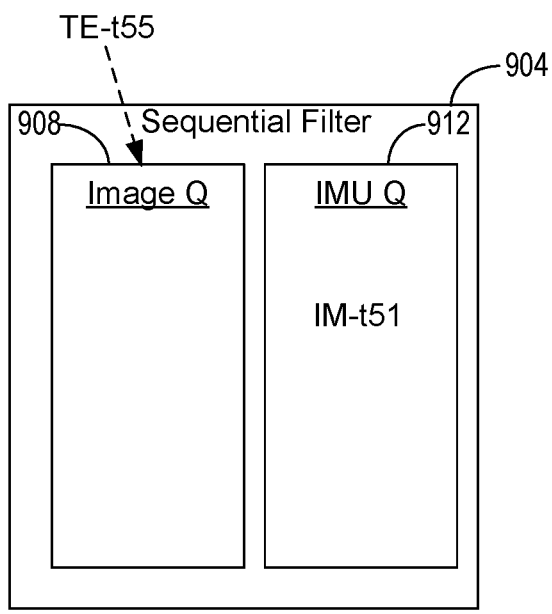
FIGS. 16 and 17 schematically show an example of updating and publishing a current internal pose from the first filter.
Figure 17:
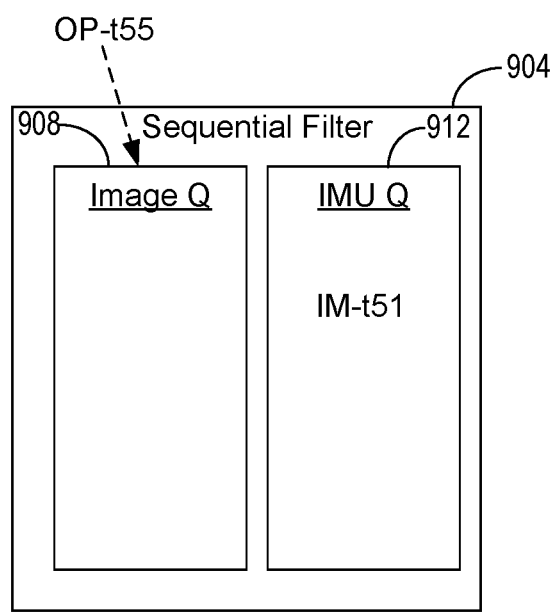

As noted above, the sequential filter 904 is configured to require data in both queues before proceeding to consume data from a queue and publish a new pose. In this manner, data consumed and published by the sequential filter 904 is guaranteed to be in temporal order, resulting in temporally accurate updated poses. In some examples, an exception to this configuration may enable the sequential filter 904 to proceed to updated and publish a pose under certain conditions when one of its queues is empty. FIGS. 16 and 17 illustrate one example of this exception. In FIG. 16, the current internal pose and the current published pose both have timestamp t44. In the sequential filter 904, the image queue 908 is empty and the IMU queue 912 receives new IMU data IM-t51.

In this example, instead of instantiating an opportunistic filter as described above, the sequential filter may determine when the temporally next data sample will be received in the empty image queue 908. In this example, because the image queue 908 is empty and image data is transmitted and received via a highly reliable wired connection (such as USB 3.0), the system may confidently expect image data to arrive at regular intervals, such as every 16.66 ms. Consequently, the likelihood of receiving delayed or out-of-order image data is exceedingly low. Accordingly, in this example the sequential filter 904 may determine that the temporally next image data sample to be received in the image queue 908 will have a future timestamp of t55 (i.e., OP-t55).

The sequential filter 904 then may determine that current data IM-t51 in the non-empty IMU queue 912 has a timestamp (t51) earlier than the future timestamp (t55). With reference now to FIG. 17, based on determining that the current data IM-t51 in the non-empty IMU queue 912 has a timestamp earlier than the future timestamp t55, the current data is used to update the current internal pose of the handheld object to a current internal exception pose t44+IM-t51 of the handheld object. Additionally, as there is high confidence that the temporally next image data sample OP-t55 will not arrive delayed or out-of-order, the current internal exception pose t44+IM-t5 is also published as the current published exception pose.

Figure 8C:
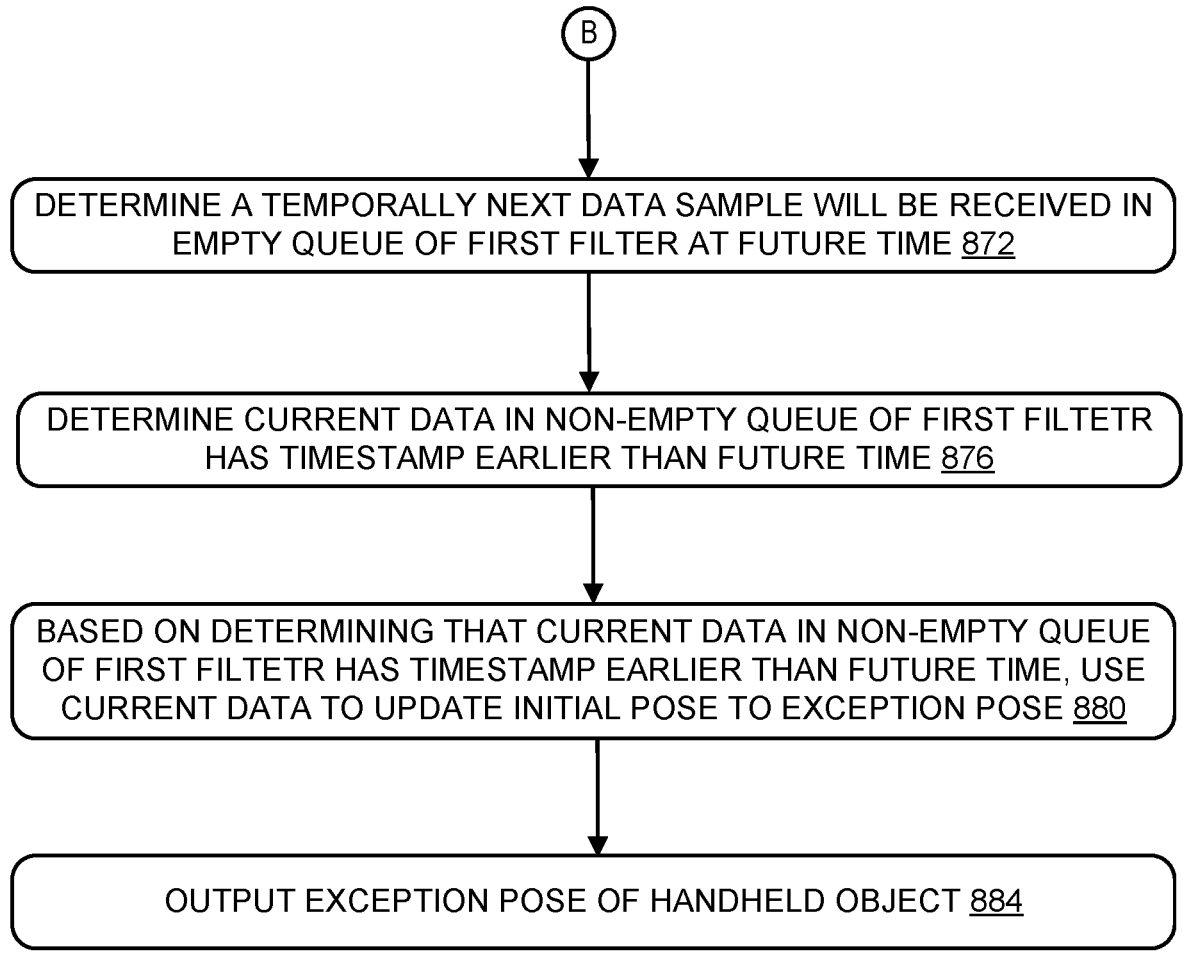

Accordingly and with reference to FIG. 8C, at 872 the method 800 may include determining that a temporally next data sample will be received in the empty queue of the first filter at a future time. At 876 the method 800 may include determining that current data in the non-empty queue of the first filter has a timestamp earlier than the future time. At 880 the method 800 may include, based on determining that the current data in the non-empty queue of the first filter has a timestamp earlier than the future time, using the current data to update the initial pose of the handheld object to an exception pose of the handheld object. At 884 the method 800 may include outputting the exception pose of the handheld object.

The methods and processes described herein may be tied to a computing system of one or more computing devices, such as a head-mounted device or a host computer. In particular, such methods and processes may be implemented as a computer-application program or service, an application-programming interface (API), a library, and/or other computer-program product.

Figure 18:
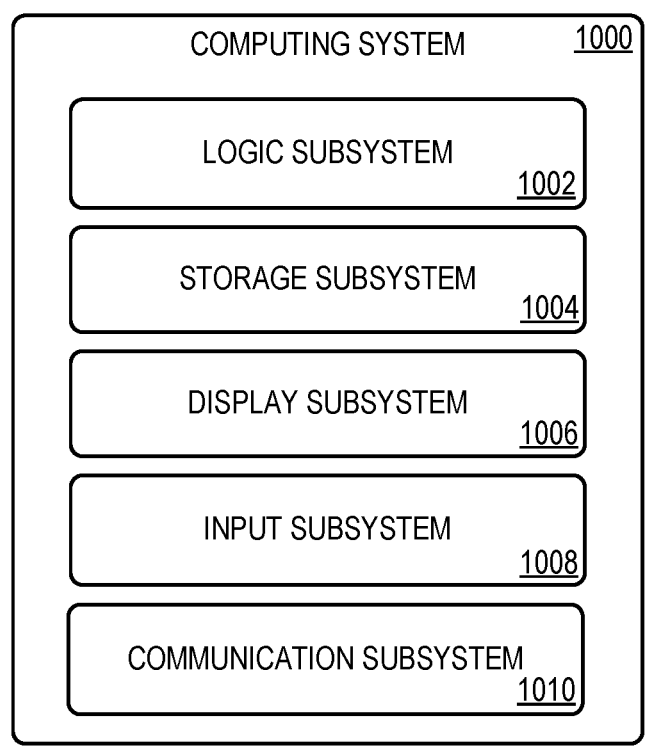
FIG. 18 is a block diagram showing an example computing system.

FIG. 18 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices, such as head-mounted display device 102, handheld object 106, and host computing device 110.

Computing system 1000 includes a logic subsystem 1002 and a storage subsystem 1004. Computing system 1000 may optionally include a display subsystem 1006, input subsystem 1008, communication subsystem 1010, and/or other components not shown in FIG. 18.

Logic subsystem 1002 includes one or more physical devices configured to execute instructions. For example, logic subsystem 1002 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 1002 may include one or more processors configured to execute software instructions. Additionally or alternatively, logic subsystem 1002 may include one or more hardware or firmware logic machines configured to execute hardware or firmware instructions. Processors of logic subsystem 1002 may be single-core or multi-core, and the instructions executed thereon may be configured for sequential, parallel, and/or distributed processing. Individual components of logic subsystem 1002 optionally may be distributed among two or more separate devices, which may be remotely located and/or configured for coordinated processing. Aspects of logic subsystem 1002 may be virtualized and executed by remotely accessible, networked computing devices configured in a cloud-computing configuration.

Storage subsystem 1004 includes one or more physical devices configured to hold instructions executable by logic subsystem 1002 to implement the methods and processes described herein. When such methods and processes are implemented, the state of storage subsystem 1004 may be transformed—e.g., to hold different data.

Storage subsystem 1004 may include removable and/or built-in devices. Storage subsystem 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1004 may include volatile, nonvolatile, dynamic, static, read/write, read-only, random-access, sequential-access, location-addressable, file-addressable, and/or content-addressable devices.

It will be appreciated that storage subsystem 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1006 and storage subsystem 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1006 may be used to present a visual representation of data held by storage subsystem 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic subsystem 1002 and/or storage subsystem 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Examples of NUI componentry may include a microphone for speech and/or voice recognition; an infrared camera, color camera, stereoscopic camera, and depth camera each of which may be used for machine vision and/or gesture recognition; a head tracker, eye tracker, accelerometer, and gyroscope, each of which may be used for motion detection and/or intent recognition; and electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

The following paragraphs provide additional support for the claims of the subject application. One aspect provides, at a computing device, a method for determining a pose of a handheld object in a surrounding environment, the method comprising: receiving image data of the surrounding environment from an image sensing system; storing optical pose data derived from the image data in an image queue of a first filter; receiving inertial measurement unit (IMU) data from an IMU of the handheld object; storing the IMU data in an IMU queue of the first filter; determining an initial pose of the handheld object using at least a portion of the optical pose data and at least a portion of the IMU data from the first filter; outputting the initial pose of the handheld object; determining that one of the image queue and the IMU queue is empty and the other queue is non-empty; based on determining that one of the image queue and the IMU queue is empty and the other queue is non-empty, instantiating a second filter as a copy of the first filter comprising the one empty queue and the other non-empty queue; using the data from the non-empty queue in the second filter to update the initial pose of the handheld object to an updated pose of the handheld object; and outputting the updated pose of the handheld object. The method may additionally or alternatively include waiting for a timeframe to expire before outputting the updated pose of the handheld object; and based on determining that the timeframe has expired, outputting the updated pose of the handheld object. The method may additionally or alternatively include, wherein a length of the timeframe is determined based on whether the empty queue is the image queue or the IMU queue. The method may additionally or alternatively include adjusting a length of the timeframe based on time differences between consecutive measurements of the IMU data during a preceding time window. The method may additionally or alternatively include adjusting the length of the timeframe periodically at a predetermined frequency. The method may additionally or alternatively include, wherein the updated pose is a first updated pose, after outputting the first updated pose of the handheld object from the second filter, receiving prior IMU data having a data timestamp earlier than a pose timestamp of the first updated pose; populating the IMU queue of the first filter with the prior IMU data; using the prior IMU data to update the first updated pose to a second updated pose; and refraining from outputting the second updated pose. The method may additionally or alternatively include, determining that a temporally next data sample to be received at a future time in the empty queue of the first filter will have a future timestamp; determining that current data in the non-empty queue of the first filter has a timestamp earlier than the future timestamp; based on determining that the current data in the non-empty queue of the first filter has a timestamp earlier than the future timestamp, using the current data to update the initial pose of the handheld object to an exception pose of the handheld object; and outputting the exception pose of the handheld object. The method may additionally or alternatively include, wherein the IMU data is received via a wireless protocol. The method may additionally or alternatively include, wherein the image sensing system comprises one or more cameras on a head-mounted display device.

Another aspect provides a computing device for determining a pose of a handheld object in a surrounding environment, the computing device comprising: a logic device configured to execute instructions; and a storage device comprising instructions executable by the logic device to:

receive image data of the surrounding environment from an image sensing system; store optical pose data derived from the image data in an image queue of a first filter; receive inertial measurement unit (IMU) data from an IMU of the handheld object; store the IMU data in an IMU queue of the first filter; determine an initial pose of the handheld object using at least a portion of the optical pose data and at least a portion of the IMU data from the first filter; output the initial pose of the handheld object; determine that one of the image queue and the IMU queue is empty and the other queue is non-empty; based on determining that one of the image queue and the IMU queue is empty and the other queue is non-empty, instantiate a second filter as a copy of the first filter comprising the one empty queue and the other non-empty queue; use the data from the non-empty queue in the second filter to update the initial pose of the handheld object to an updated pose of the handheld object; and output the updated pose of the handheld object. The computing device may additionally or alternative include, wherein the instructions are executable to: wait for a timeframe to expire before outputting the updated pose of the handheld object; and based on determining that the timeframe has expired, output the updated pose of the handheld object. The computing device may additionally or alternative include, wherein a length of the timeframe is determined based on whether the empty queue is the image queue or the IMU queue. The computing device may additionally or alternative include, wherein the instructions are executable to adjust a length of the timeframe based on time differences between consecutive measurements of the IMU data during a preceding time window. The computing device may additionally or alternative include, wherein the instructions are executable to periodically adjust the length of the timeframe at a predetermined frequency. The computing device may additionally or alternative include, wherein the updated pose is a first updated pose, and the instructions are executable to: after outputting the first updated pose of the handheld object from the second filter, receive prior IMU data having a data timestamp earlier than a pose timestamp of the first updated pose; populate the IMU queue of the first filter with the prior IMU data; use the prior IMU data to update the first updated pose to a second updated pose; and refrain from outputting the second updated pose. The computing device may additionally or alternative include, wherein the instructions are executable to: determine that a temporally next data sample to be received at a future time in the empty queue of the first filter will have a future timestamp; determine that current data in the non-empty queue of the first filter has a timestamp earlier than the future timestamp; based on determining that the current data in the non-empty queue of the first filter has a timestamp earlier than the future timestamp, use the current data to update the initial pose of the handheld object to an exception pose of the handheld object; and output the exception pose of the handheld object. The computing device may additionally or alternative include, wherein the IMU data is received via a wireless protocol. The computing device may additionally or alternative include, wherein the image sensing system comprises one or more cameras on a head-mounted display device.

Another aspect provides a head-mounted display device, comprising: an image sensing system; and a computing device comprising: a logic device configured to execute instructions; and a storage device comprising instructions executable by the logic device to: receive image data of the surrounding environment from an image sensing system; store optical pose data derived from the image data in an image queue of a first filter; receive inertial measurement unit (IMU) data from an IMU of the handheld object; store the IMU data in an IMU queue of the first filter; determine an initial pose of the handheld object using at least a portion of the optical pose data and at least a portion of the IMU data from the first filter; output the initial pose of the handheld object; determine that one of the image queue and the IMU queue is empty and the other queue is non-empty; based on determining that one of the image queue and the IMU queue is empty and the other queue is non-empty, instantiate a second filter as a copy of the first filter comprising the one empty queue and the other non-empty queue; use the data from the non-empty queue in the second filter to update the initial pose of the handheld object to an updated pose of the handheld object; and output the updated pose of the handheld object. The head-mounted display device may additionally or alternative include, wherein the instructions are executable to: wait for a timeframe to expire before outputting the updated pose of the handheld object; and based on determining that the timeframe has expired, output the updated pose of the handheld object.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method for determining a pose of a handheld object in a surrounding environment, the method comprising:
    receiving image data of the surrounding environment from an image sensing system;
    storing optical pose data derived from the image data in an image queue of a first filter;
    receiving inertial measurement unit (IMU) data from an IMU of the handheld object;
    storing the IMU data in an IMU queue of the first filter;
    determining an initial pose of the handheld object using at least a portion of the optical pose data and at least a portion of the IMU data from the first filter;
    outputting the initial pose of the handheld object;
    determining that one of the image queue and the IMU queue is empty and the other queue is non-empty;
    based on determining that one of the image queue and the IMU queue is empty and the other queue is non-empty, instantiating a second filter as a copy of the first filter comprising the one empty queue and the other non-empty queue;
    using the data from the non-empty queue in the second filter to update the initial pose of the handheld object to an updated pose of the handheld object; and
    outputting the updated pose of the handheld object.

2. The method of claim 1, further comprising:
    waiting for a timeframe to expire before outputting the updated pose of the handheld object; and
    based on determining that the timeframe has expired, outputting the updated pose of the handheld object.

3. The method of claim 2, wherein a length of the timeframe is determined based on whether the empty queue is the image queue or the IMU queue.

4. The method of claim 2, further comprising adjusting a length of the timeframe based on time differences between consecutive measurements of the IMU data during a preceding time window.

5. The method of claim 4, further comprising adjusting the length of the timeframe periodically at a predetermined frequency.

6. The method of claim 1, wherein the updated pose is a first updated pose, the method further comprising:
after outputting the first updated pose of the handheld object from the second filter, receiving prior IMU data having a data timestamp earlier than a pose timestamp of the first updated pose;
populating the IMU queue of the first filter with the prior IMU data;
using the prior IMU data to update the first updated pose to a second updated pose; and
refraining from outputting the second updated pose.

7. The method of claim 1, further comprising:
determining that a temporally next data sample to be received at a future time in the empty queue of the first filter will have a future timestamp;
determining that current data in the non-empty queue of the first filter has a timestamp earlier than the future timestamp;
based on determining that the current data in the non-empty queue of the first filter has a timestamp earlier than the future timestamp, using the current data to update the initial pose of the handheld object to an exception pose of the handheld object; and
outputting the exception pose of the handheld object.

8. The method of claim 1, wherein the IMU data is received via a wireless protocol.

9. The method of claim 1, wherein the image sensing system comprises one or more cameras on a head-mounted display device.

10. A computing device for determining a pose of a handheld object in a surrounding environment, the computing device comprising:
a logic device configured to execute instructions; and
a storage device comprising instructions executable by the logic device to:
receive image data of the surrounding environment from an image sensing system;
store optical pose data derived from the image data in an image queue of a first filter;
receive inertial measurement unit (IMU) data from an IMU of the handheld object;
store the IMU data in an IMU queue of the first filter;
determine an initial pose of the handheld object using at least a portion of the optical pose data and at least a portion of the IMU data from the first filter;
output the initial pose of the handheld object;
determine that one of the image queue and the IMU queue is empty and the other queue is non-empty;
based on determining that one of the image queue and the IMU queue is empty and the other queue is non-empty, instantiate a second filter as a copy of the first filter comprising the one empty queue and the other non-empty queue;
use the data from the non-empty queue in the second filter to update the initial pose of the handheld object to an updated pose of the handheld object; and
output the updated pose of the handheld object.

11. The computing device of claim 10, wherein the instructions are executable to:
wait for a timeframe to expire before outputting the updated pose of the handheld object; and
based on determining that the timeframe has expired, output the updated pose of the handheld object.

12. The computing device of claim 11, wherein a length of the timeframe is determined based on whether the empty queue is the image queue or the IMU queue.

13. The computing device of claim 11, wherein the instructions are executable to adjust a length of the timeframe based on time differences between consecutive measurements of the IMU data during a preceding time window.

14. The computing device of claim 13, wherein the instructions are executable to periodically adjust the length of the timeframe at a predetermined frequency.

15. The computing device of claim 10, wherein the updated pose is a first updated pose, and the instructions are executable to:
after outputting the first updated pose of the handheld object from the second filter, receive prior IMU data having a data timestamp earlier than a pose timestamp of the first updated pose;
populate the IMU queue of the first filter with the prior IMU data;
use the prior IMU data to update the first updated pose to a second updated pose; and
refrain from outputting the second updated pose.

16. The computing device of claim 10, wherein the instructions are executable to:
determine that a temporally next data sample to be received at a future time in the empty queue of the first filter will have a future timestamp;
determine that current data in the non-empty queue of the first filter has a timestamp earlier than the future timestamp;
based on determining that the current data in the non-empty queue of the first filter has a timestamp earlier than the future timestamp, use the current data to update the initial pose of the handheld object to an exception pose of the handheld object; and
output the exception pose of the handheld object.

17. The computing device of claim 10, wherein the IMU data is received via a wireless protocol.

18. The computing device of claim 10, wherein the image sensing system comprises one or more cameras on a head-mounted display device.

19. A head-mounted display device, comprising:
an image sensing system; and
a computing device comprising:
a logic device configured to execute instructions; and
a storage device comprising instructions executable by the logic device to:
receive image data of the surrounding environment from an image sensing system;
store optical pose data derived from the image data in an image queue of a first filter;
receive inertial measurement unit (IMU) data from an IMU of the handheld object;
store the IMU data in an IMU queue of the first filter;
determine an initial pose of the handheld object using at least a portion of the optical pose data and at least a portion of the IMU data from the first filter;
output the initial pose of the handheld object;
determine that one of the image queue and the IMU queue is empty and the other queue is non-empty;

based on determining that one of the image queue and the IMU queue is empty and the other queue is non-empty, instantiate a second filter as a copy of the first filter comprising the one empty queue and the other non-empty queue;
use the data from the non-empty queue in the second filter to update the initial pose of the handheld object to an updated pose of the handheld object; and
output the updated pose of the handheld object.

20. The head-mounted display device of claim 19, wherein the instructions are executable to:
wait for a timeframe to expire before outputting the updated pose of the handheld object; and
based on determining that the timeframe has expired, output the updated pose of the handheld object.

* * * * *